(12) United States Patent
Gong et al.

(10) Patent No.: US 12,742,944 B2
(45) Date of Patent: Sep. 22, 2026

(54) ZOOM LENS ASSEMBLY

(71) Applicant: ZHONGSHAN UNION OPTECH RESEARCH INSTITUTE CO., LTD., Zhongshan (CN)

(72) Inventors: Junqiang Gong, Zhongshan (CN); Meijiao Zhao, Zhongshan (CN); Kun Li, Zhongshan (CN); Shengping Qiu, Zhongshan (CN)

(73) Assignee: ZHONGSHAN UNION OPTECH RESEARCH INSTITUTE CO., LTD., Zhongshan (CN)

( * ) Notice: Subject to any disclaimer, the term of this patent is extended or adjusted under 35 U.S.C. 154(b) by 259 days.

(21) Appl. No.: 18/659,960

(22) Filed: May 9, 2024

(65) Prior Publication Data

US 2025/0347891 A1 Nov. 13, 2025

(51) Int. Cl.
*G02B 7/10* (2021.01)
*G02B 7/00* (2021.01)
*G02B 7/09* (2021.01)

(52) U.S. Cl.
CPC ............ *G02B 7/102* (2013.01); *G02B 7/005* (2013.01); *G02B 7/09* (2013.01)

(58) Field of Classification Search
None
See application file for complete search history.

(56) References Cited

FOREIGN PATENT DOCUMENTS

CN 113296227 A * 8/2021 ............ G03B 13/34

* cited by examiner

*Primary Examiner* — Phu Vu
(74) *Attorney, Agent, or Firm* — Westbridge IP LLC

(57) ABSTRACT

A zoom lens assembly includes a lens barrel, at least one moving group, and a magnetic drive assembly. At least one moving group is movably installed at the lens barrel along a front-to-back direction, and the at least one moving group is configured for installing a lens. A magnetic drive assembly is configured for driving the moving group to move along the front-to-back direction, where the magnetic drive assembly includes a drive coil and a magnet structure; one of the drive coil and the magnet structure is fixed to the moving group, and the other of the drive coil and the magnet structure is fixed to the lens barrel; and the drive coil is provided in a magnetic field generated by the magnet structure to generate an electromagnetic drive force in combination with the magnet structure when the drive coil is energized.

8 Claims, 8 Drawing Sheets

ZOOM LENS ASSEMBLY

TECHNICAL FIELD

The present application relates to the technical field of zoom lenses, and in particular to a zoom lens assembly.

BACKGROUND

With the rapid development of high technology, security optical zoom lenses have been widely used, and stepper motors are widely used in the automatic zoom and focus of optical zoom lenses.

The precision of existing stepper motor drive method applied in the zoom lens is affected by several factors. The precision of the stepper motor is mainly related to the subdivision technology. The subdivision technology of the stepper motor is an electronic damping technology designed to reduce or eliminate the low-frequency vibration of the stepper motor and improve the motor operating accuracy. For example, for a two-phase hybrid stepper motor with a stepping angle of 1.8°, the subdivision number of the subdivision driver is set to 4, then the motor operating resolution is 0.45° per pulse. However, whether the accuracy of the motor can reach or be close to 0.45° also depends on other factors, such as the subdivision current control accuracy of the subdivision driver. The accuracy of subdivision drives from different manufacturers may vary greatly. The larger the subdivision number, the more difficult it is to control the accuracy. In addition, stepper motors are prone to losing steps, which will cause the actual position during operation to be different from the theoretical value, thereby causing deviations. In addition, the machining error of the workpiece and the meshing transmission error of the focusing gear will also affect the final accuracy. Therefore, the application of stepper motor drive methods in zoom lenses generally suffers from the problem of low focusing accuracy.

SUMMARY

The main purpose of the present application is to provide a zoom lens assembly, aiming to solve the problem of low focusing accuracy of the existing zoom lens assembly.

In order to achieve the above objectives, the present application provides a zoom lens assembly including a lens barrel, at least one moving group, and a magnetic drive assembly. At least one moving group is movably installed at the lens barrel along a front-to-back direction, and the at least one moving group is configured for installing a lens. A magnetic drive assembly is configured for driving the moving group to move along the front-to-back direction, where the magnetic drive assembly includes a drive coil and a magnet structure; one of the drive coil and the magnet structure is fixed to the moving group, and the other of the drive coil and the magnet structure is fixed to the lens barrel; the drive coil is provided in a magnetic field generated by the magnet structure to generate an electromagnetic drive force in combination with the magnet structure when the drive coil is energized; one of the lens barrel and the moving group includes an installation portion, and the installation portion is provided with an installation groove for installing the drive coil.

In an embodiment, the moving group includes the installation portion, and the magnet structure is connected to the lens barrel.

In an embodiment, the installation portion is provided with an installation hole for installing the lens, and an end face of the installation portion along the front-to-back direction is recessed with the installation groove; the installation groove is provided adjacent to the installation hole, and the installation groove is provided with a through groove passing through a bottom of the installation groove.

The magnet structure includes a magnetic yoke and a magnet.

The magnetic yoke is provided between the installation portion and the lens barrel, the magnetic yoke includes a plurality of magnetic yoke segments, and the plurality of magnetic yoke segments include a first magnetic yoke segment and a second magnetic yoke segment both extending along the front-to-back direction and being spaced apart; the first magnetic yoke segment is installed at an inner wall of the lens barrel, and the second magnetic yoke segment is provided at a side of the first magnetic yoke segment facing the installation portion and is installed at the drive coil in the installation groove.

The magnet extends along the front-to-back direction, the magnet is provided at a side of the first magnetic yoke segment facing the second magnetic yoke segment and is configured to correspond to the installation groove.

In an embodiment, the installation groove and the through groove are configured to pass through a periphery of the installing portion laterally.

In an embodiment, the installation groove is configured to pass through a periphery of the installation portion laterally.

In an embodiment, the bottom of the installation groove is further provided with a limiting projection, and the limiting projection is spaced apart from a side wall of the installation groove so as to make a clamping space formed between the limiting projection and the side wall of the installation groove for clamping the drive coil.

In an embodiment, the side wall of the installation groove is further recessed with a dispensing groove, and the dispensing groove is configured to pass through the end face.

In an embodiment, the lens barrel is provided with a connection hole passing through the lens barrel; the first magnetic yoke segment is penetrated and provided with a threaded hole corresponding to the connection hole, and the magnetic yoke is fixed to the lens barrel by a screw connection piece passing through the connection hole and being screwed to the threaded hole.

In an embodiment, the lens barrel is provided with a connection hole passing through the lens barrel; a side portion of the first magnetic yoke segment is configured to extend outwardly to from a connection portion, and the connection portion is penetrated and provided with a threaded hole corresponding to the connection hole; the magnetic yoke is fixed to the lens barrel by a screw connection piece passing through the connection hole and being screwed to the threaded hole.

In an embodiment, the moving group is provided with a guide hole along the front-to-back direction. The zoom lens assembly further includes a guide bar; the guide bar is fixed to the lens barrel along the front-to-back direction and is configured to pass through the guide hole, and the moving group is configured to slide along the guide bar.

In the technical solution of the present application, the magnet structure provides a permanent magnetic field. Through changing the magnitude of the current, the magnitude of the electromagnetic drive force can be changed, and the position of the lens can be controlled accurately by adjusting the movement of the moving group, thereby achieving precise focus adjustment. In addition, the installation portion includes an installation groove, which plays a better positioning and fixing role for the drive coils. When the moving group is provided at the same position, the position of the drive coil in the magnetic field will not change, and then the length and the direction of the drive coil in the magnetic field will not change, so that the direction of the electromagnetic drive force to which the drive coil is subjected will not change, so that it is convenient to accurately control the magnitude of the drive force of the drive coil in the front-to-back directions, which is beneficial for accurately regulating the position of the moving group and the lens.

BRIEF DESCRIPTION OF THE DRAWINGS

To illustrate the technical solutions according to the embodiments of the present application or the related art more clearly, the accompanying drawings for describing the embodiments or the related art are introduced briefly in the following. Apparently, the accompanying drawings in the following description are only some embodiments of the present application. Persons skilled in the art can derive other drawings from the accompanying drawings without creative efforts.

Figure 1:
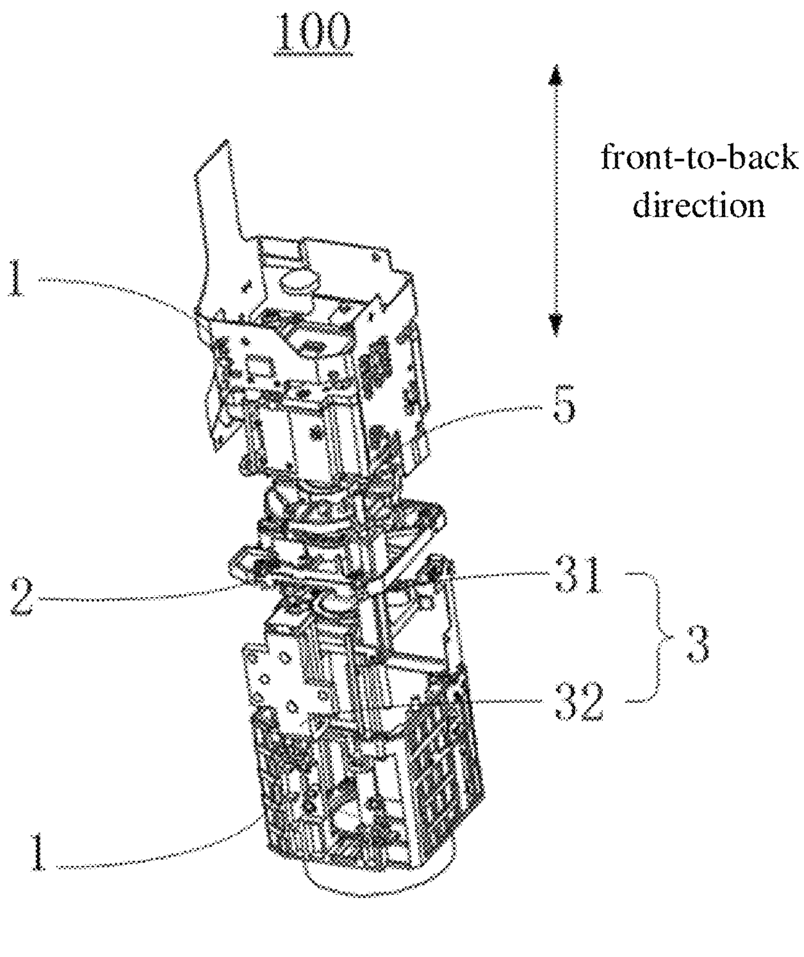
FIG. 1 is an exploded schematic diagram of a zoom lens assembly according to an embodiment of the present application.

The realization of the objective, functional characteristics, and advantages of the present application are further described with reference to the accompanying drawings.

DETAILED DESCRIPTION OF THE EMBODIMENTS

The technical solutions of the embodiments of the present application will be described in detail below with reference to the accompanying drawings. It is obvious that the embodiments to be described are only some rather than all of the embodiments of the present application. All other embodiments obtained by persons skilled in the art based on the embodiments of the present application without creative efforts shall fall within the scope of the present application.

It should be noted that all the directional indications (such as up, down, left, right, front, rear . . . ) in the embodiments of the present application are only used to explain the relative positional relationship, movement, or the like of the components in a certain posture (as shown in the drawings). If the specific posture changes, the directional indication will change accordingly.

Besides, the descriptions associated with, e.g., “first” and “second,” in the present application are merely for descriptive purposes, and cannot be understood as indicating or suggesting relative importance or impliedly indicating the number of the indicated technical feature. Therefore, the feature associated with “first” or “second” can expressly or impliedly include at least one such feature. Moreover, the meaning of “and/or” appearing in the entire text includes three parallel solutions. Taking “A and/or B” as an example, it includes solution A, or solution B, or a solution that satisfies both A and B at the same time. In addition, the technical solutions of the various embodiments can be combined with each other, but the combinations must be based on the realization of those skilled in the art. When the combination of technical solutions is contradictory or cannot be achieved, it should be considered that such a combination of technical solutions does not exist, nor does it fall within the scope of the present application.

At present, the zoom lens assembly usually adopts a stepping motor driving method, which will cause low focusing accuracy.

In order to solve the above problem, the present application provides a zoom lens assembly, and FIG. 1 to FIG. 8 show embodiments of the zoom lens assembly in the present application.

As shown in FIG. 1 to FIG. 8, the zoom lens assembly 100 includes: a lens barrel 1, at least one moving group 2, and a magnetic drive assembly 3. The at least one moving group 2 is installed at the lens barrel 1 movable along a front-to-back direction. The at least one moving group 2 is configured for installing a lens. The magnetic drive assembly 3 is configured for driving the moving group 2 to move along the front-to-back direction. The magnetic drive assembly 3 includes a drive coil 31 and a magnet structure 32. One of the drive coil 31 and the magnet structure 32 is fixed to the moving group 2, and another one of the drive coil 31 and the magnet structure 32 is fixed to the lens barrel 1. The drive coil 31 is provided in a magnetic field generated by the magnet structure 32 to generate an electromagnetic drive force in combination with the magnet structure 32 when the drive coil 31 is energized. One of the lens barrel 1 and the moving group 2 includes an installation portion 4, and the installation portion 4 is provided with an installation groove 42 for installing the drive coil 31.

Figure 3:
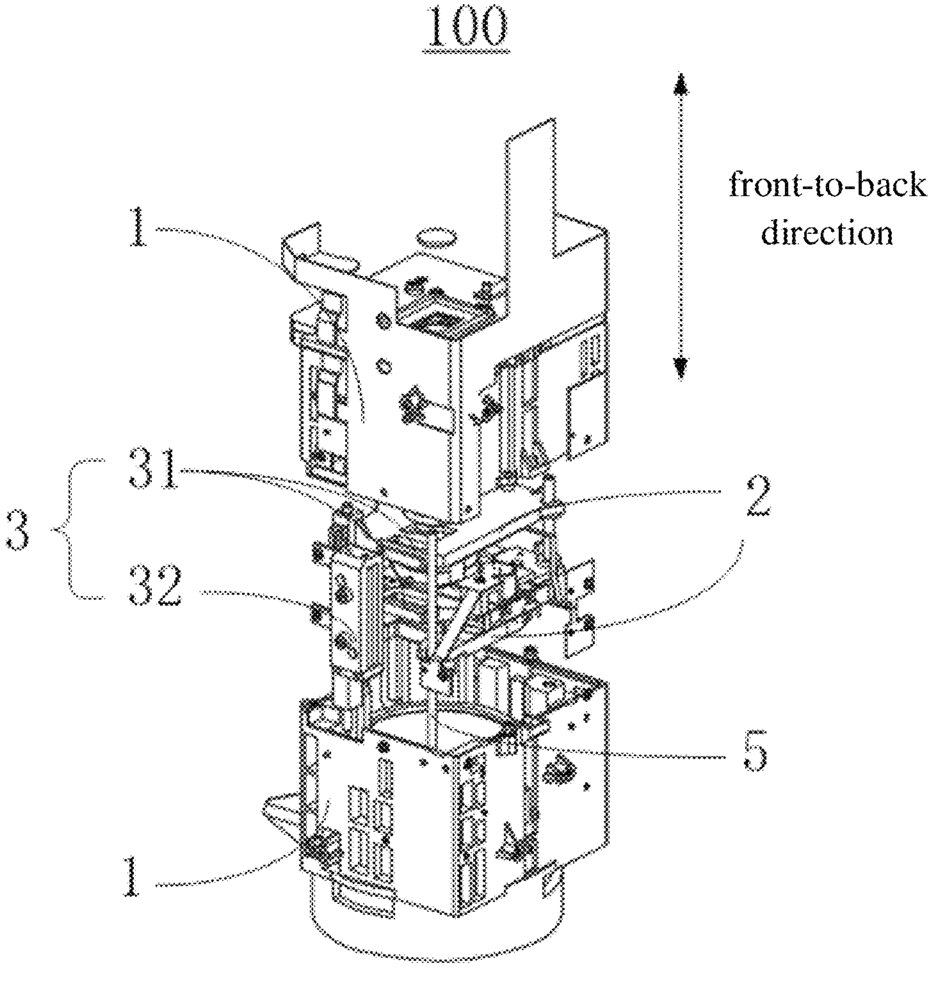
FIG. 3 is an exploded schematic diagram of the zoom lens assembly in FIG. 1 according to yet another embodiment of the present application.

In the technical solution of the present application, the magnetic drive assembly 3 includes a drive coil 31 and a magnet structure 32. The magnet structure 32 provides a permanent magnetic field. At least partial drive coil 31 is provided in the magnetic field, and when the current is introduced into the drive coil 31, an electromagnetic drive force is generated between the drive coil 31 and the magnet structure 32. The drive coil 31 and the magnet structure 32 are provided at the lens barrel 1 and the moving group 2, so that the electromagnetic drive force exists between the lens barrel 1 and the moving group 2. Since the lens barrel 1 is fixed, the lens barrel 1 includes a cavity along the front-to-back direction. The moving group 2 is provided in the cavity and can slide along the direction of movement of the cavity, so that the electromagnetic drive force can control the movement of the moving group 2. The magnitude of the electromagnetic drive force is adjusted by varying the magnitude of the direct current of the drive coil 31 to control the movement of the moving group 2. Through changing the direction of the current, the direction of the electromagnetic drive force can be changed, and the position of the lens can be controlled accurately by adjusting the magnitude and direction of the current, thereby achieving precise focus adjustment. Since the zoom lens assembly 100 may include a plurality of lenses, and the plurality of lenses need to be movably set, it is easier to adjust the focus, so the zoom lens assembly 100 includes at least one moving group 2, and the number of lenses of which the position that needs to be changed corresponds to the number of moving groups 2 (as shown in FIG. 3). In addition, the installation portion 4 includes an installation groove 42, which plays a better positioning and fixing role for the drive coils 31. When the moving group 2 is provided at the same position, the position of the drive coil 31 in the magnetic field will not change, and then the length and the direction of the drive coil 31 in the magnetic field will not change, so that the direction of the electromagnetic drive force to which the drive coil 31 is subjected will not change, so that it is convenient to accurately control the magnitude of the drive force of the drive coil 31 in the front-to-back directions, which is beneficial for accurately regulating the position of the moving group 2 and the lens.

Figure 2:
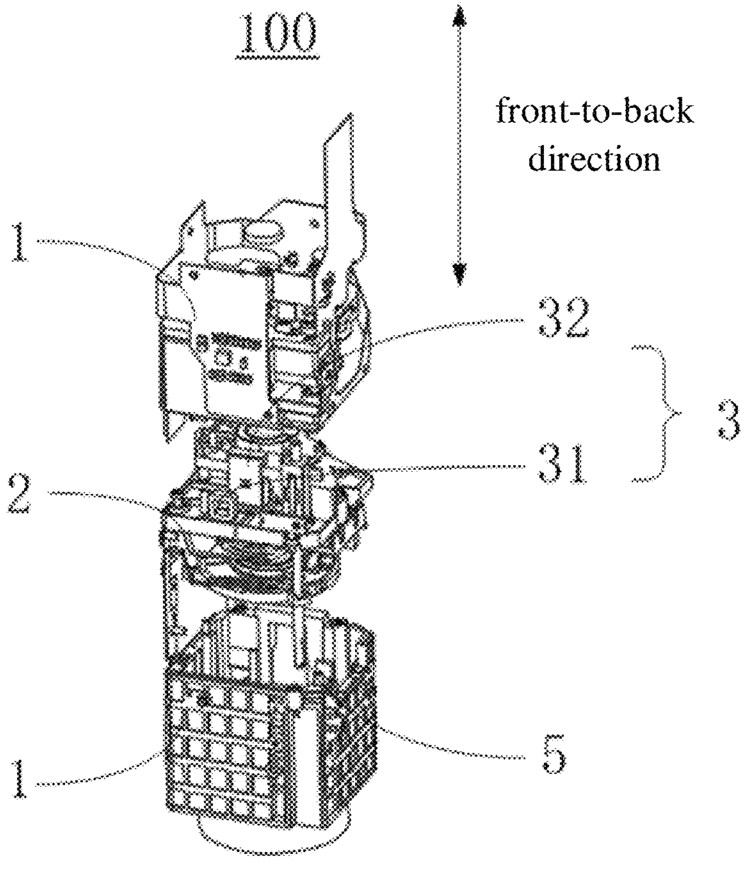
FIG. 2 is an exploded schematic diagram of the zoom lens assembly in FIG. 1 according to another embodiment of the present application.

The drive coil 31 needs to be fixed with the help of the installation groove 42 for positioning and fixing, and the installation groove 42 can be provided at the lens barrel 1 or provided at the moving group 2. The stepping motor is applied to the zoom lens assembly 100 in the related art, and the coil of the stepping motor does not rotate. By introducing the current in the coil, a magnetic field can be generated, which in turn drives the rotor of the stepping motor to rotate, so that the wires will swing and will bend, thus the durability of the stepping motor is low. In order to prevent the rotation of the coil from causing the durability of the wire to be lowered, in an embodiment (as shown in FIG. 2), the installation groove 42 is provided at the lens barrel 1, the coil is installed in the installation groove 42, and the magnet structure 32 is provided at the moving group 2, so that the coil is fixed, and the moving group 2 is movable along the front-to-back direction under the action of the electromagnetic drive force of the magnet structure 32, and in this case, there is no wire that will move along with the moving group 2, and no wire will swing or bend. Therefore, in this embodiment, the service life of the zoom lens assembly 100 is longer, and the durability is higher. In addition, in another embodiment (as shown in FIG. 1), the installation groove 42 and the drive coil 31 are provided at the moving group 2. Since the drive coil 31 is light in mass and has low inertia, the corresponding moving group 2 can realize extremely fast response speed, and is able to adjust the focal length in a very short period of time. In all embodiments of the present application, the moving group 2 is driven by electromagnetic drive force. Since there are no conventional mechanical gears, there is virtually no noise or vibration, and quiet operation can be realized. Moreover, errors in control accuracy due to processing errors in mechanical parts (such as gears, and the like) are eliminated.

In order to realize the high speed response and high energy efficiency of the zoom lens assembly 100, the moving group 2 includes an installation portion 4, and the magnet structure 32 is connected to the lens barrel 1. In this way, due to the light mass and small inertia of the drive coil 31, the corresponding moving group 2 and the lens can realize an extremely fast response speed and can adjust the focal length in a very short time. Due to the small mass, so that only less work needs to be done to control the lens to move to the corresponding position. Therefore, the zoom lens assembly 100 in the present application has a low power consumption, which can effectively utilize electrical energy, reduce energy waste, and solve the heat generation problems.

Figure 7:
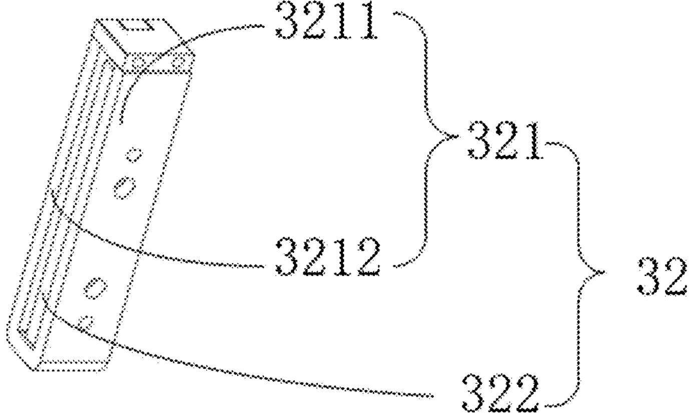
FIG. 7 is a three-dimensional schematic diagram of a center magnet structure in the zoom lens assembly according to a first embodiment of FIG. 1.
Figure 8:
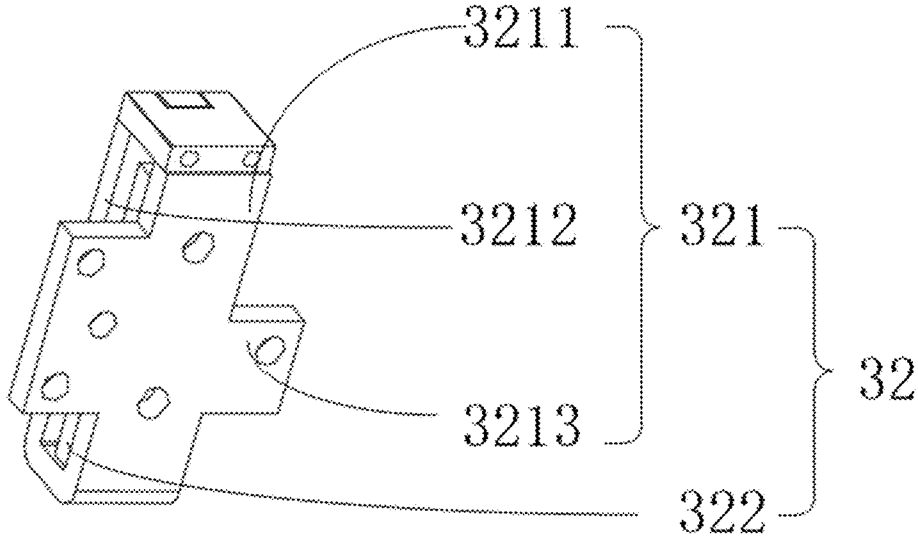
FIG. 8 is a three-dimensional schematic diagram of the center magnet structure in the zoom lens assembly according to a second embodiment of FIG. 1.

In order to strengthen the magnetic field strength, the magnet structure 32 includes a magnet 322 and a magnetic yoke 321 (as shown in FIG. 7 and FIG. 8), and the magnetic yoke 321 is provided around the outer side of the magnet 322 for restraining and guiding the magnetic force. the magnetic yoke 321 is usually made of silicon steel sheets stacked on top of each other, and is uniformly and symmetrically distributed around the part of the drive coil 31 that is provided in the magnetic field. Further, the magnetic yoke 321 can restrain the magnetic susceptibility line from spreading outwardly, and can increase the electromagnetic drive force to which the moving group 2 is subjected. The electromagnetic drive force to which the moving group 2 is subjected is determined by the formula: F (electromagnetic drive force)=B (magnetic field strength) I (current size) L (coil length), and when the required F and L are constant, the larger the magnetic field strength, the smaller the required current, and the smaller the corresponding heat generated, thereby preventing the zoom lens assembly 100 from getting hot. In addition, the smaller the heat generated, the higher the corresponding mechanical efficiency ($\eta$). The specifical arrangement of the magnet structure 32 is as follows: the magnetic yoke 321 is provided between the installation portion 4 and the lens barrel 1, the magnetic yoke 321 includes a plurality of magnetic yoke segments, the plurality of magnetic yoke segments include the first magnetic yoke segment 3211 and the second magnetic yoke segment 3212 that both extend along a front-to-back direction and are provided at intervals. The first magnetic yoke segment 3211 is installed at the inner wall of the lens barrel 1. The second magnetic yoke segment 3212 is provided at a side of the first magnetic yoke segment 3211 facing the installation portion 4, and is installed at the drive coil 31 in the installation groove 42. The magnet 322 extends along the front-to-back direction, and is provided at the side of the first magnetic yoke segment 3211 facing the second magnetic yoke segment 3212 corresponding to the installation groove 42.

Figure 4:
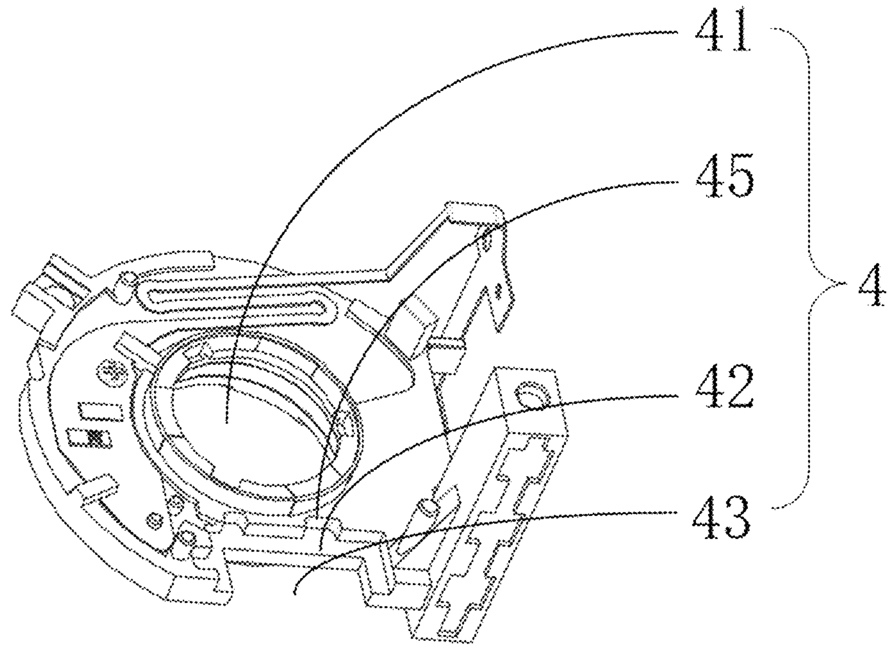
FIG. 4 is a three-dimensional schematic diagram of a center installation portion in the zoom lens assembly according to a first embodiment of FIG. 1.
Figure 5:
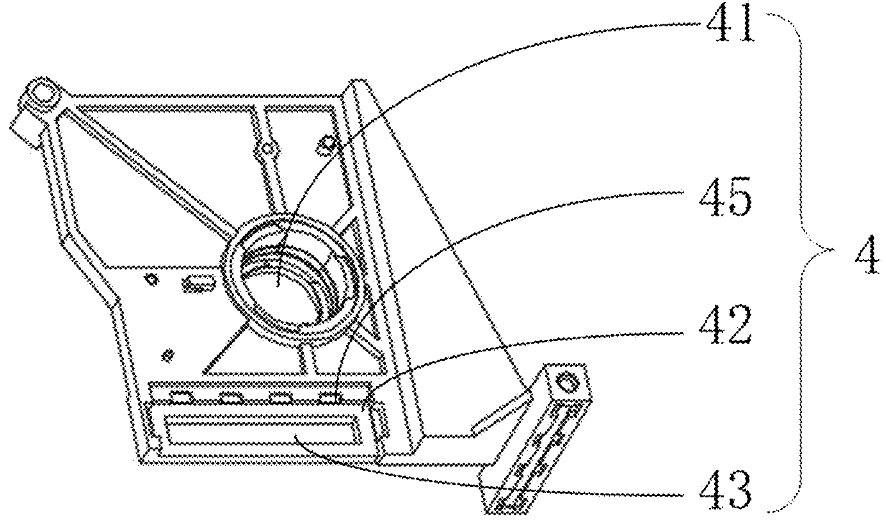
FIG. 5 is a three-dimensional schematic diagram of the center installation portion in the zoom lens assembly according to a second embodiment of FIG. 1.
Figure 6:
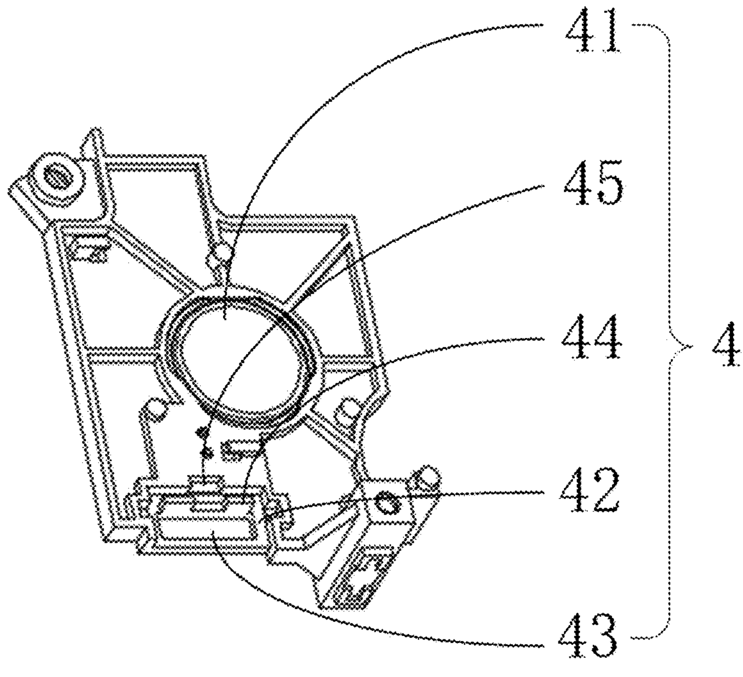
FIG. 6 is a three-dimensional schematic diagram of the center installation portion in the zoom lens assembly according to a third embodiment of FIG. 1.

The lenses are generally provided in a centre position of the moving group 2, so that the installation portion 4 is provided with installation holes 41 for installing the lenses (as shown in FIG. 4 to FIG. 6), and the installation holes 41 are also provided in a centre position on the upper end surface of the moving group 2 along the front-to-back direction. Therefore, in the fixing method of the drive coil 31, the magnet structure 32 passes through the internal of the drive coil 31, and the magnet structure 32 is also in a closed shape to prevent the movement of the magnetic drive assembly 3 from interfering with the lens provided within the installation hole 41. The installation groove 42 is provided at the side of the installation hole 41, and since the second magnetic yoke segment 3212 needs to pass through the internal of the drive coil 31, the drive coil 31 is provided inside the magnet structure 32, the bottom of the groove of the installation groove 42 is provided with a through groove 43 for the second magnetic yoke segment 3212 to avoid. In the embodiment for installing and fixing the drive coil 31, as for the first embodiment (as shown in FIG. 4), the installation groove 42 and the through groove 43 pass through the peripheral side of the installation portion 4 laterally, and the through zone is large, so that the mass of the moving group 2 is lighter, and it is easier to drive and adjust the drive coil 2. Moreover, the drive coil 31 is provided directly opposite to the magnet structure 32, and there is no other component (the side of the through groove 43 facing the magnet structure 32 is through, there is no side wall, and the inside of the drive coil 31 only requires the second magnetic yoke segment 3212 to pass through). This arrangement corresponds to the installation of a drive coil 31 with a smaller volume, and the internal space of the drive coil 31 is narrow. The bottom of the installation groove 42 can support three edges of the drive coil 31, and three sidewalls of the installation groove 42 can be used for positioning the drive coil 31. Since the drive coil 31 is provided at the bottom of the side inside the magnet structure 32 and is not supported by a support surface, the adjustable travel is obtained by subtracting the thickness of the drive coil 31 from the size of the inside of the magnet structure 32 in the front-to-back direction, and there is no need to subtract the thickness of the support surface. In this setting method, the adjustment range for the focal length can be maximized.

In the second embodiment (as shown in FIG. 5), the installation groove 42 extends laterally through the circumference of the installation portion 4. The bottom of the installation groove 42 can support four edges of the drive coil 31, and the three sidewalls of the installation groove 42 can be used to position the drive coil 31. The installation groove 42 can support the bottom of the coil, which makes the fixing of the drive coil 31 steady. In addition, the internal space of the drive coil 31 corresponding to installation of the drive coil 31 in this embodiment is large. Since there are sidewalls around the through groove 43, and the sidewalls of the through groove 43 and the second magnetic yoke segment 3212 need to pass through the internal of the drive coil 31.

In a third embodiment (as shown in FIG. 6), the bottom of the groove of the installation groove 42 is also provided with a limiting projection 44, and the limiting projection 44 is provided spaced apart from the side wall of the installation groove 42, to make a clamping space formed between the limiting projection 44 with the side wall of the installation groove 42 for clamping the drive coil 31. The clamping space can clamp against one side wall of the drive coil 31, which is beneficial for positioning and driving the drive coil 3, which can also prevent the drive coil 31 from deflecting when performing dispensing fixation on the drive coil 31. The present application includes, but is not limited to, the above three embodiments, for example, in a fourth embodiment, the limiting projection 44 may be provided based on the first embodiment.

After positioning the drive coil 31, it is also necessary to fix the drive coil 31, and setting metal parts can fix the drive coil 31, which may have an effect on the current and resistance in the drive coil 31, and will aggravate the weight on the moving group 2. Therefore, a dispensing form is used to fix the drive coil 31, and the side wall of the installation groove 42 is also recessed with a dispensing groove 45. Glue is injected into the dispensing groove 45, so that the drive coil 31 is fixedly connected to the moving group 2. In order to facilitate the injection of glue, the dispensing groove 45 will pass through the end face. In order to be fixed more firmly, a plurality of the dispensing grooves 45 are provided along the periphery of the installation groove 42 (as shown in FIG. 4 to FIG. 6). In addition, the arrangement of the dispensing grooves 45 can reduce the weight of the moving group 2, and the glue is lighter in weight and is insulating.

The setting method in which the magnet structure 32 is provided at the lens barrel 1 also includes the first embodiment and the second embodiment. In the first embodiment, the magnet structure 32 is provided at the lens barrel 1 (as shown in FIG. 7), the lens barrel 1 is provided with a connection hole passing through the lens barrel 1, and the first magnetic yoke segment 3211 is penetrated and provided with a threaded hole corresponding to the connection hole. The magnetic yoke 321 is connected to the lens barrel 1 by a screw connection piece passing through the connection hole and being screwed to the threaded hole. In this arrangement, the magnetic yoke 321 is compact and lightweight, which can reduce the weight and size of the zoom lens assembly 100. In addition, since the holes are punched directly on the first magnetic yoke segment 3211, the magnetic yoke 321 includes a more uniform profile distribution, so the magnetic field distribution inside the magnet structure 32 is also more uniform. This fixation method of the magnet structure 32 is suitable for assembling the magnet structure 32 completely inside the lens barrel 1.

In the second embodiment, the magnet structure 32 is fixed to the lens barrel 1 (as shown in FIG. 8), the lens barrel 1 is provided with a connection hole, and a connection portion 3213 extends outwardly from the side of the first magnetic yoke segment 3211. The connection portion 3213 is provided with threaded holes corresponding to the connection holes, and the magnet yoke 321 is fixed to the lens barrel 1 by a screw connection piece passing through the connection hole and being screwed to the threaded hole. In this arrangement, the magnet structure 32 can be provided inside the lens barrel 1 to realize internal assembly, or a hole can be punched in the lens barrel 1, the magnet structure 32 extends into the hole from the outside, and the connecting portion 3213 is provided outside the hole for fixing the connection. The exposed assembly is realized. A threaded hole is provided in the connection portion 3213, and can be fixed by using a bolt. There is no limitation on the length of the screw connection piece. In the embodiment of the fixed structure of the first type of the magnet structure 32, since the screw connection piece cannot interfere with the magnet 322, the screw connection piece cannot pass through the threaded hole. Considering the connection strength, the thickness of the first magnetic yoke segment 3211 needs to be set thicker.

In order to make the lens movable only in the front-to-back direction without offset in other directions, the moving group 2 is provided with a guide hole along the front-to-back direction. The zoom lens assembly 100 further includes a guide bar 5. The guide bar 5 is fixed to the lens barrel 1 along the front-to-back direction (as shown in FIG. 1 to FIG. 3) and passes through the guide hole. The moving group 2 is configured to slide along the guide bar 5. The guide bar 5 can be used for guiding and limiting.

The above are only some embodiments of the present application, and do not limit the scope of the present application thereto. Under the concept of this application, any equivalent structural transformation made according to the description and drawings of the present application, or direct/indirect application in other related technical fields shall fall within the claimed scope of the present application.

What is claimed is:

1. A zoom lens assembly, comprising:

a lens barrel;

at least one moving group movably installed at the lens barrel along a front-to-back direction, wherein the at least one moving group is configured for installing a lens; and a magnetic drive assembly configured for driving the moving group to move along the front-to-back direction, wherein the magnetic drive assembly comprises a drive coil and a magnet structure; one of the drive coil and the magnet structure is fixed to the moving group, and the other of the drive coil and the magnet structure is fixed to the lens barrel; the drive coil is provided in a magnetic field generated by the magnet structure to generate an electromagnetic drive force in combination with the magnet structure when the drive coil is energized; one of the lens barrel and the moving group comprises an installation portion, and the installation portion is provided with an installation groove for installing the drive coil;

wherein the moving group comprises the installation portion, and the magnet structure is connected to the lens barrel;

the installation portion is provided with an installation hole for installing the lens, and an end face of the installation portion along the front-to-back direction is recessed with the installation groove; the installation groove is provided adjacent to the installation hole, and the installation groove is provided with a through groove passing through a bottom of the installation groove;

the magnet structure comprises:

a magnetic yoke provided between the installation portion and the lens barrel, wherein the magnetic yoke comprises a plurality of magnetic yoke segments, and the plurality of magnetic yoke segments comprise a first magnetic yoke segment and a second magnetic yoke segment both extending along the front-to-back direction and being spaced apart; the first magnetic yoke segment is installed at an inner wall of the lens barrel, and the second magnetic yoke segment is provided at a side of the first magnetic yoke segment facing the installation portion and is installed at the drive coil in the installation groove; and a magnet extending along the front-to-back direction, wherein the magnet is provided at a side of the first magnetic yoke segment facing the second magnetic yoke segment and is configured to correspond to the installation groove.

2. The zoom lens assembly of claim 1, wherein the installation groove and the through groove are configured to pass through a periphery of the installing portion laterally.

3. The zoom lens assembly of claim 1, wherein the installation groove is configured to pass through a periphery of the installation portion laterally.

4. The zoom lens assembly of claim 1, wherein the bottom of the installation groove is further provided with a limiting projection, and the limiting projection is spaced apart from a side wall of the installation groove so as to make a clamping space formed between the limiting projection and the side wall of the installation groove for clamping the drive coil.

5. The zoom lens assembly of claim 2, wherein the side wall of the installation groove is further recessed with a dispensing groove, and the dispensing groove is configured to pass through the end face.

6. The zoom lens assembly of claim 1, wherein the lens barrel is provided with a connection hole passing through the lens barrel; the first magnetic yoke segment is penetrated and provided with a threaded hole corresponding to the connection hole, and the magnetic yoke is fixed to the lens barrel by a screw connection piece passing through the connection hole and being screwed to the threaded hole.

7. The zoom lens assembly of claim 1, wherein the lens barrel is provided with a connection hole passing through the lens barrel; a side portion of the first magnetic yoke segment is configured to extend outwardly to from a connection portion, and the connection portion is penetrated and provided with a threaded hole corresponding to the connection hole; the magnetic yoke is fixed to the lens barrel by a screw connection piece passing through the connection hole and being screwed to the threaded hole.

8. The zoom lens assembly of claim 1, wherein:

the moving group is provided with a guide hole along the front-to-back direction; and the zoom lens assembly further comprises a guide bar; the guide bar is fixed to the lens barrel along the front-to-back direction and is configured to pass through the guide hole, and the moving group is configured to slide along the guide bar.

* * * * *